(12) United States Patent
Kim

(10) Patent No.: US 9,463,710 B2
(45) Date of Patent: Oct. 11, 2016

(54) SYSTEM AND METHOD OF BALANCING BATTERY CELL

(71) Applicants: Hyundai Motor Company, Seoul (KR); Kia Motors Corporation, Seoul (KR)

(72) Inventor: Beom Gyu Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 212 days.

(21) Appl. No.: 14/044,168

(22) Filed: Oct. 2, 2013

(65) Prior Publication Data

US 2015/0008886 A1    Jan. 8, 2015

(30) Foreign Application Priority Data

Jul. 2, 2013   (KR) ................ 10-2013-0076959

(51) Int. Cl.
*B60L 11/18*    (2006.01)

(52) U.S. Cl.
CPC ......... *B60L 11/1866* (2013.01); *B60L 2240/36* (2013.01); *B60L 2240/545* (2013.01); *B60L 2240/547* (2013.01); *B60L 2240/549* (2013.01); *B60L 2240/80* (2013.01); *Y02T 10/7005* (2013.01); *Y02T 10/7061* (2013.01)

(58) Field of Classification Search
CPC .................................................. B60L 11/1866
USPC ......................................................... 320/136
See application file for complete search history.

(56) References Cited

U.S. PATENT DOCUMENTS

| | | | | |
|---|---|---|---|---|
| 6,081,095 A * | 6/2000 | Tamura | ............... | B60L 11/1861 320/118 |
| 7,956,580 B2 * | 6/2011 | Sugimoto | ............. | H02J 7/0016 320/132 |
| 8,865,328 B2 * | 10/2014 | Kim | ............................. | 320/134 |
| 2011/0210614 A1 * | 9/2011 | Min | ......................... | H02J 3/32 307/82 |
| 2013/0113280 A1 * | 5/2013 | Yang | ..................... | H02J 7/0016 307/19 |
| 2013/0113432 A1 * | 5/2013 | Suzuki | .................. | H02J 7/0014 320/134 |
| 2013/0328397 A1 * | 12/2013 | Lee | .......................... | H02J 3/32 307/23 |
| 2015/0008886 A1 * | 1/2015 | Kim | .................... | B60L 11/1866 320/136 |

FOREIGN PATENT DOCUMENTS

| | | |
|---|---|---|
| JP | 2006-115640 A | 4/2006 |
| JP | 2011-155751 A | 8/2011 |
| JP | 2012-115100 A | 6/2012 |
| JP | 2012-115101 A | 6/2012 |
| JP | 2012115100 A | 6/2012 |

* cited by examiner

*Primary Examiner* — Edward Tso
*Assistant Examiner* — Dung V Bui
(74) *Attorney, Agent, or Firm* — Mintz Levin Cohn Ferris Glovsky and Popeo, P.C.; Peter F. Corless

(57) ABSTRACT

A method and system of balancing battery cells are provided that use a data map that includes a balancing duty ratio based on an environment temperature of a battery and the number of balancing target-cells. The method includes measuring, by a temperature sensor, the environment temperature of a battery. In addition, a controller is configured to identify the number of the balancing target-cells and calculate a balancing duty ratio by substituting the environment temperature and the number of the balancing-target cells to the data map. A balancing time is deducted by the controller based on the calculated duty ratio and the corresponding battery cells are balanced by the controller with the calculated duty ratio for the balancing time.

6 Claims, 2 Drawing Sheets

SYSTEM AND METHOD OF BALANCING BATTERY CELL

CROSS-REFERENCE TO RELATED APPLICATION

This application claims under the benefit of Korean Patent Application No. 10-2013-0076959 filed Jul. 2, 2013, the entire contents of which are incorporated herein by reference.

BACKGROUND (a) Technical Field

The present disclosure relates to a system and method of balancing battery cells in a high voltage battery pack used in vehicles such as hybrid electric vehicles (HEV), plug-in hybrid vehicle (PHEV) and electric vehicles (EV).

(b) Background Art

Generally, battery packs that are connected in series have been used as a main/auxiliary power source to improve travel distance/fuel ratio in environmentally friendly vehicles such as HEV, PHEV, and EV.

It is important to prevent deterioration of a battery in a vehicle that uses the battery for an extended period of time, and thus a cell balancing has been performed to minimize life deviations produced among the cells to prevent the battery deterioration. In the cell balancing, a passive balancing is mainly used, in which resistance that discharges a cell with high voltage or capacity is used to consume capacity, thereby lowering voltage. Further, the capacity of a battery is directly linked to a travel distance in an EV, etc., and thus the capacity of a battery is under an increasing tendency. Accordingly, consumption current/power of the discharging resistance, required for balancing the cells, is increased and thus cost of a controller and size of a balancing system increases.

In a current balancing method of cells, a balancing resistance is used at a level to which damage is not caused based on a temperature increase of the balancing resistance based on a maximum temperature of an operation environment of a controller when a balancing is performed. Further, when a balancing is performed based on an environment temperature, a heat value may not be determined and a specification of the system may be determined based on a high temperature to decrease a discharging efficiency as compared to the designed specification. When a balancing resistance is about 27Ω, and about 1.5 W is used, a balancing of the entire cells is performed based on about 75° C. of an operation environment, and then the temperature of resistance increases to about 200° C. or more within about 30 minutes. In particular, when the temperature of resistance increases to about 200° C. or more, a crack may occur in the resistance (the reference temperature certificated by a general resistance supplier is 155° C.).

The invention disclosed in this background of the invention section is merely for enhancement of understanding of the background of the invention and should not be taken as an acknowledgement or any form of suggestion that this information forms the prior art already known to a person skilled in the art.

SUMMARY

The present invention provides a system and method of balancing battery cells in a high voltage battery pack used in vehicles such as HEV, PHEV and EV.

In particular, the present invention provides a method of balancing battery cells, using a data map that includes a balancing duty ratio based on an environment temperature of a battery and the number of balancing target-cells. The method may include measuring the environment temperature of a battery; identifying the number of the balancing target-cells; calculating a balancing duty ratio by substituting the environment temperature and the number of the balancing-target cells to the data map; deducting a balancing time based on the calculated duty ratio; and balancing the corresponding battery cells with the calculated duty ratio for the balancing time.

The method of balancing battery cells may further include periodically measuring the environment temperature of a battery and re-calculating the balancing duty ratio when the environment temperature varies. The balancing time necessary for balancing each battery cell may be deducted when the balancing target-cell is plural, in the balancing time deducting step. In addition, the method of balancing battery cells may further include re-calculating the balancing duty ratio when the balancing of some battery cells is ended while balancing a plurality of battery cells.

Another method of balancing the battery cells of the present invention may include providing a data map that includes a balancing duty ratio based on the environment temperature and the number of the balancing target-cells, calculating a duty ratio from the data map based on the environment temperature and the number of the balancing target-cells, and balancing of the battery cells with the corresponding duty ratio. The duty ratio may be re-calculated from the map data to perform the balancing of the battery cells, when the environment temperature or the number of the balancing target-cells varies during the balancing.

A system of balancing battery cells of the present invention may include: a temperature sensor configured to measure an environment temperature of a battery; and a balancing controller provided with a data map that includes a balancing duty ratio based on the environment temperature of a battery and the number of balancing target-cells, wherein the balancing controller may be configured to calculate the duty ratio from the data map based on the environment temperature of a battery and the number of balancing target-cells when a balancing of a battery cell is performed, and execute the balancing of the battery cell with the duty ratio.

BRIEF DESCRIPTION OF THE DRAWINGS

The above and other features of the present invention will now be described in detail with reference to exemplary embodiments thereof illustrated in the accompanying drawings which are given herein below by way of illustration only, and thus are not limitative of the present invention, and wherein.

DETAILED DESCRIPTION

Figure 1:
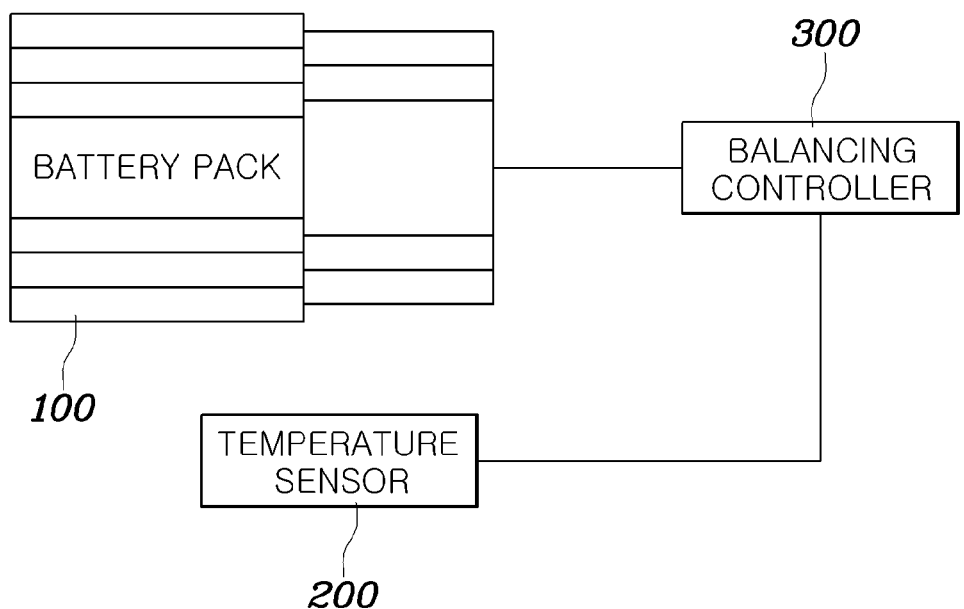
FIG. 1 is an exemplary view showing a system of balancing battery cells according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles, and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a temperature control apparatus of a battery system for a vehicle and a method thereof according to an exemplary embodiment of the present invention will be described, referring to the accompanying drawings.

Figure 2:
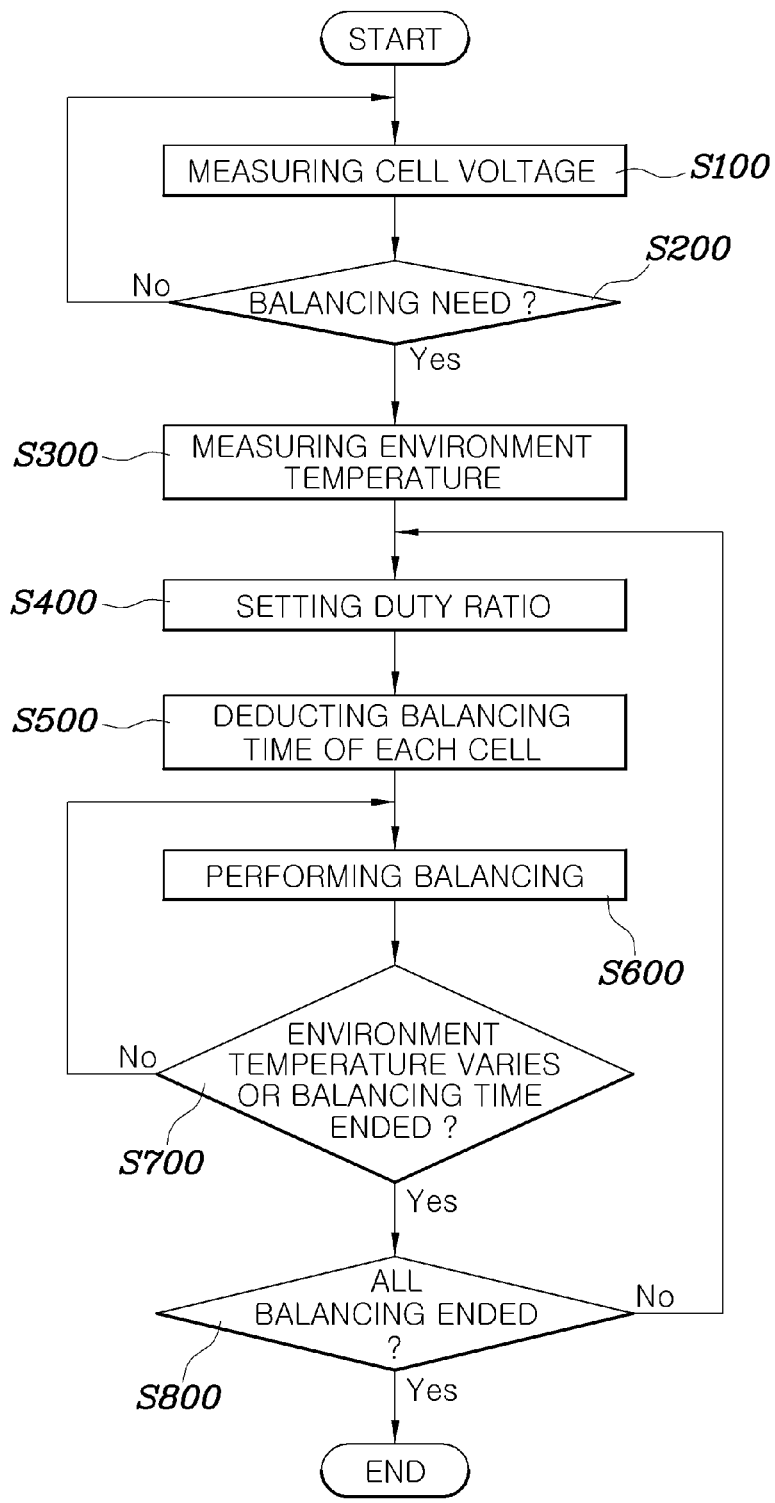
FIG. 2 is an exemplary block diagram showing sequentially a method of balancing battery cells according to an exemplary embodiment of the present invention.

FIG. 1 is an exemplary view showing a system of balancing battery cells according to an exemplary embodiment of the present invention, and FIG. 2 is an exemplary block diagram showing sequentially a method of balancing battery cells according to an exemplary embodiment of the present invention.

First, as shown in FIG. 1, a system of balancing battery cells of the present invention may include a temperature sensor 200 configured to measure an environment temperature of a battery; and a balancing controller 300 that may have a data map including a balancing duty ratio based on the environment temperature of a battery and the number of balancing target-cells, and may be configured to calculate the duty ratio from the data map based on the environment temperature of a battery and the number of balancing target-cells when a balancing of a battery cell 10 is performed, and execute the balancing of the battery cell 100 with the duty ratio. In other words, a temperature sensor may be disposed in an inner side or external side of a battery pack to measure an environment temperature of a battery. The resistance to perform a balancing of cells may be affected by the environment temperature and thus the environment temperature may be measured representatively by the temperature sensor.

Furthermore, the balancing controller may be provided in advance with the data map in which the environment temperature and the number of the balancing-target cells may be input and from which the balancing duty ratio may be output. Accordingly, the balancing controller may be configured to identify the balancing-target cells and output a proper balancing duty ratio using the environment temperature and the number of the balancing-target cells before the balancing is performed. In addition, the balancing of the battery cells may then be performed based on the duty ratio. In particular, the duty ratio may be varied based on the environment temperature and the number of the balancing-target cells when the balancing is performed, and thus temperature may be predicted and controlled to operate stably the balancing resistance without measuring directly heat value of the balancing resistance.

Meanwhile, a method of balancing battery cells of the present invention, using a data map that has a balancing duty ratio based on an environment temperature and the number of the balancing-target cells, may include: measuring, by a temperature sensor, the environment temperature of a battery S300; identifying, by a controller, the number of the balancing target-cells S200; calculating, by the controller, a balancing duty ratio by substituting the environment temperature and the number of the balancing-target cells to the data map S400; deducting, by the controller, a balancing time based on the calculated duty ratio S500; and balancing, by the controller, the corresponding battery cells with the calculated duty ratio for the balancing time S600.

As shown in FIG. 2, first, the balancing target-battery cells may be identified by measuring voltages of the battery cells S100, S200 and then the environment temperature may be measured S300. After that, the measured environment temperature and the number of battery cells requiring balancing may be identified and then substituted to the data map, to calculate a proper duty ratio therefrom S400.

Furthermore, the time necessary for balancing each batter cell may be deducted S500. In particular, the time for balancing the cell may be deducted through the resistance using the duty ratio that is calculated in advance. During a summer time when the environment temperature is substantially high, or when the number of the balancing target-cells is substantially large, the temperature of resistance may be expected to increase abruptly and thus the duty ratio may be maintained at a substantially low level and the balancing time may be delayed with the lowered duty ratio. When the duty ratio and the balancing time are determined, the balancing of each cell may be performed with the determined duty ratio for the determined time S600.

Moreover, the method of balancing battery cells of the present invention may further include re-calculating, by the controller, the duty ratio by periodically measuring the environment temperature of a battery and re-calculating the duty ratio when the environment temperature varies S700. In other words, when the environment temperature varies during the balancing, the duty ratio may be calculated again and the balancing time may be calculated again therefrom to perform the balancing, to prevent the damage of resistance even when the temperature varies.

Furthermore, in the time deducting step, the balancing time necessary for balancing each battery cell may be deducted, when the balancing target-cell is plural. Additionally, when the balancing of some battery cells has stopped while balancing a plurality of battery cells, a step of re-calculating the balancing duty ratio may be further included. In other words, when the balancing time of any one of battery cells has ended while balancing a plurality of battery cells, the duty ratio may be re-calculated based on the environment temperature and the varied number of the balancing target-battery cells, and the balancing time may be re-calculated therefrom to perform the balancing, thereby performing the balancing more rapidly within a range of not damaging resistance. After that, the balancing may be completed when all cells are balanced S800.

According to another method of balancing the battery cells of the present invention, a data map that has a balancing duty ratio based on the environment temperature and the number of the balancing target-cells is provided, and a duty ratio may be calculated from the data map based on the environment temperature and the number of the balancing target-cells, and the battery cells may be balanced with the corresponding duty ratio. Furthermore, when the environment temperature or the number of the balancing target-cells varies during the balancing, the duty ratio may be re-calculated from the map data to perform the balancing of the battery cells.

According to a system and method of balancing battery cells as configured above, the damage to the balancing resistance may be prevented by measuring the environment temperature and without measuring directly a heat value of each battery cell. The duty ratio may be variably controlled based on the environment temperature and the number of the balancing target-cells thereby to improve a using efficiency of the balancing resistance.

While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the accompanying claims.

What is claimed is:

1. A method of balancing battery cells, using a data map including a balancing duty ratio based on an environment temperature of a battery and the number of balancing target-cells, comprising:
   measuring, by a temperature sensor, an environment temperature of a battery;
   identifying, by a controller, the number of the balancing target-cells;
   calculating, by the controller, a balancing duty ratio by substituting the environment temperature and the number of the balancing-target cells to the data map;
   balancing, by the controller, the balancing target-cells with the calculated duty ratio; and
   re-calculating, by the controller, the balancing duty ratio when the balancing of some balancing target-cells had ended while balancing a plurality of balancing target-cells.

2. The method of balancing battery cells of claim 1, further comprising:
   periodically measuring, by the controller, the environment temperature of a battery and re-calculating the balancing duty ratio when the environment temperature varies.

3. A system of balancing battery cells, comprising:
   a temperature sensor configured to measure an environment temperature of a battery; and
   a controller that has a data map including a balancing duty ratio based on the environment temperature of a battery and the number of balancing target-cells, and is configured to:
      calculate the duty ratio from the data map based on the environment temperature of a battery and the number of balancing target-cells when a balancing of a battery cell is performed;
      execute the balancing of the balancing target-cells with the corresponding duty ratio; and
      re-calculate the balancing duty ratio when the balancing of some balancing target-cells has ended while balancing a plurality of balancing target cells.

4. The system of balancing battery cells of claim 3, wherein the controller is further configured to:
   identify the number of the balancing target-cells;
   calculate a balancing duty ratio by substituting the environment temperature and the number of the balancing-target cells to the data map; and
   balance the balancing target-cells with the calculated duty ratio.

5. A non-transitory computer readable medium containing program instructions executed by a controller, the computer readable medium comprising:
   program instructions that control a temperature sensor to measure an environment temperature of a battery;
   program instructions that identify the number of the balancing target-cells;
   program instructions that calculate a balancing duty ratio by substituting the environment temperature and the number of the balancing-target cells to the data map;
   program instructions that balance the balancing target-cells with the calculated duty ratio for the balancing time; and
   program instructions that re-calculate the balancing duty ratio when the balancing of some balancing target-cells had ended while balancing a plurality of balancing target cells.

6. The non-transitory computer readable medium of claim 5, further comprising:
   program instructions that periodically measure the environment temperature of a battery and re-calculating the balancing duty ratio when the environment temperature varies.

* * * * *